United States Patent
Frank et al.

(10) Patent No.: US 6,787,973 B2
(45) Date of Patent: Sep. 7, 2004

(54) DEVICE FOR TRANSMITTING AN EXCURSION OF AN ACTUATOR

(75) Inventors: Wilhelm Frank, Bambeg (DE); Thomas Komischke, Berlin (DE); Maximilian Kronberger, Regensburg (DE); Harald Schmidt, Vienna (AT)

(73) Assignee: Volkswagen Mechatronic GmbH & Co. (DE)

( * ) Notice: Subject to any disclaimer, the term of this patent is extended or adjusted under 35 U.S.C. 154(b) by 0 days.

(21) Appl. No.: 10/689,376

(22) Filed: Oct. 20, 2003

(65) Prior Publication Data

US 2004/0119377 A1 Jun. 24, 2004

Related U.S. Application Data

(63) Continuation of application No. PCT/DE01/01521, filed on Apr. 20, 2001.

(51) Int. Cl.[7] .................................................. H02N 2/00
(52) U.S. Cl. ................ 310/328; 310/331; 310/355; 310/316.01; 310/323.01; 29/25.35; 123/470; 251/129.11
(58) Field of Search .......................... 310/328, 331, 310/316.01, 355, 323.01; 123/470; 251/129.11; 29/25.35

(56) References Cited

U.S. PATENT DOCUMENTS

| | | | |
|---|---|---|---|
| 4,101,076 A | | 7/1978 | Bart ............................. 239/584 |
| 4,695,034 A | | 9/1987 | Shimizu et al. .......... 251/129.06 |
| 4,705,588 A | * | 11/1987 | Treiber ......................... 53/441 |
| 5,975,433 A | * | 11/1999 | Hasegawa et al. ...... 239/533.12 |
| 6,066,912 A | * | 5/2000 | Fitzner et al. ............... 310/328 |
| 6,611,076 B2 | * | 8/2003 | Lindbery et al. ............ 310/216 |
| 6,684,854 B2 | * | 2/2004 | Coldren et al. .............. 123/458 |

FOREIGN PATENT DOCUMENTS

| | | | | |
|---|---|---|---|---|
| DE | 3530729 A1 | | 3/1986 | ........... H01L/41/08 |
| DE | 19902807 C1 | * | 6/2000 | ........... F02M/51/06 |
| DE | 199 02 260 A1 | | 9/2000 | ........... F02M/51/00 |
| DE | 199 11 047 A1 | | 9/2000 | ........... F02M/51/06 |
| EP | 0 065 784 A2 | | 5/1982 | ............... B41J/3/10 |
| JP | 63226083 | | 9/1988 | ........... H01L/41/08 |
| JP | 63262065 | | 10/1988 | ............ H02N/2/00 |
| WO | WO 99/17014 | | 4/1999 | ........... F02M/51/06 |

* cited by examiner

Primary Examiner—Thomas M. Dougherty
Assistant Examiner—J. Aguirrechea
(74) Attorney, Agent, or Firm—Baker Botts L.L.P.

(57) ABSTRACT

A device for transmitting the deflection of an actuator (2), comprising at least one transmission element (4) that has a first, a second and a third support zone, said first support zone (6) being associated with a counter-support, said second support zone (8) being associated with the actuator, and said third support zone being associated with a control element (20). The at least one transmission element rests on the counter-support with the first support zone under the action of the actuator and displaces the control element with the third support zone by way of a rotational movement about a center of rotation. The at least one transmission element is substantially configured as a plate (5) that is disposed substantially perpendicular to the movement of adjustment and the first, the second and the third support zone are configured as substantially plane surfaces on the plate, further relates to a method for producing the inventive transmission element.

51 Claims, 7 Drawing Sheets

DEVICE FOR TRANSMITTING AN EXCURSION OF AN ACTUATOR

CROSS REFERENCE TO RELATED APPLICATION

This application is a continuation of copending International Application No. PCT/DE01/01521 filed Apr. 20, 2001 which designates the United States.

TECHNICAL FIELD OF THE INVENTION

The invention relates to a device for transmitting an excursion of an actuator and a method for its production according to the independent Claims.

BACKGROUND OF THE INVENTION

Actuators based on the piezoelectric principle are suitable for the highly precise and very rapid regulation of control processes, as are expedient for example for the activation of injection devices or valves in internal combustion engines. In order to achieve larger linear excursions of the piezoactuators, these have to comprise a number of individual piezoelements stacked one on top of the other. This has the disadvantage that the size of the structure assumes dimensions that are not permissible for many intended uses. For example the space for incorporating injection valves in the cylinder head of an internal combustion engine is limited so that there is generally no room for piezoactuators with the longitudinal dimension required for the required control motions. Smaller piezoactuators are therefore used, the linear excursions of which are translated by means of suitable lever devices into larger control member excursions.

An injection valve is known from U.S. Pat. No. 4,101,076 comprising a piezoelectric actuator, which activates an injection needle directly via a mechanical transmission element. The transmission element has two lever arms of different lengths, disposed at right angles to each other and connected to each other in a bearing area. The shorter lever arm is assigned to the piezoelectric actuator and the longer lever is assigned to the injection needle. The transmission element rests on the housing of the injection valve in the bearing area The excursion of the piezoelectric actuator is converted by the different lengths of the two lever arms into a larger excursion of the injection needle.

However the form of the transmission element offers only moderate rigidity, which results in imprecise excursion transmission in particular with highly dynamic circuit processes.

An injection valve is also known from WO 99/17014, with which mechanical transmission elements are provided for the transmission and translation of an excursion of a piezoactuator to a control member, said transmission elements essentially having the form of a cylinder, the limiting surfaces of which are configured in an essentially triangular manner, with the corners rounded. The width of the transmission elements causes planar bearing areas to be formed so that friction during transmission is reduced.

SUMMARY OF THE INVENTION

The object of the present invention is to provide a device for transmitting an excursion of an actuator, which is simple and small in structure and allows transmission and translation of actuator excursion to a control member with the lowest possible level of friction.

According to the invention, the device for transmitting an excursion of an actuator comprises at least one transmission element having a first, a second and a third bearing area, wherein the first bearing area is assigned to a counter bearing, the second bearing area is assigned to the actuator and the third bearing area is assigned to a control member. According to the invention, the at least one transmission element is supported with the first bearing area against the counter bearing when the actuator is operated and said transmission element moves the control member with the third bearing area by means of a rotational motion about a point of rotation, with the at least one transmission element being configured essentially in the form of a plate, which is disposed substantially perpendicular to the control motion and with the first, second and third bearing areas each being configured in the form of substantially straight surfaces on the plate.

The device according to the invention in particular has the advantage of minimizing the relative motion between the transmission elements, so that direct transmission of the excursions of the actuator is ensured with little wear and loss.

A distance between a central axis of the actuator and a central axis of the control member may be provided, with which the advantage of a relatively compact structure of the transmission element is associated, said transmission element being disposed between the actuator and the control member.

At least two transmission elements can be disposed opposite each other, which has the advantage of symmetrical distribution of the control forces both at the actuator and at the control member. Also with two transmission elements the control forces acting on each of these transmission elements are halved, as are the compressive loads acting at the respective bearing areas.

At least three transmission elements can be provided, which are disposed essentially concentrically in respect of each other. This has the advantage of further reducing the control forces and therefore the compressive loads at the respective bearing areas. Also with three or more transmission elements, these can be relatively compact in design, as they have to transmit less force in total.

Concentric central axes of the actuator and the control member can be provided, which has the advantage that the entire device is very compact. A fuel injector with the control device according to the invention can thus be relatively slim in design and is therefore also suitable for incorporation in very restricted spatial conditions, e.g. in the cylinder head of an internal combustion engine.

The plate of the at least one transmission element can be configured in a stepped manner. This embodiment according to the invention has the advantage of an ideally compact structural design, as it means that the distance between the actuator and the control member can be very small.

The second bearing area can be assigned to an upper side and the third bearing area can be assigned to a lower side of a first straight section of the stepped plate, which has the particular advantage of a very compact transmission element.

The second straight section of the stepped plate may partially encompass a lower sleeve area of the actuator, which also has the advantage of a very compact transmission element structure.

The plate can be produced by cold or hot forming. This has the particular advantage of favorable fiber orientation in the plate and therefore a very high level of strength in respect of plastic deformation subject to the operational loads occurring.

Ground surfaces of the bearing areas of the plate can be provided, with the advantage of minimizing friction between the surfaces of the bearing areas in contact.

An intermediate member connected to the actuator can be provided between the actuator and the second bearing area of the at least one transmission element. This embodiment has the advantage of an intermediate member which can be easily adapted to spatial conditions, thus contributing overall to a compact structure of the device according to the invention.

A positive, non-positive or material-fit connection between the actuator and intermediate member can be provided, which has the advantage that no further connection elements are required. This results in a light weight and a compact structure.

A linear contact between the raised edge of the intermediate member and the second bearing area of the plate can be provided, which has the advantage of good distribution of the forces occurring. Compared with point bearing, linear contact has the advantage of significantly lower compressive loads.

The height of the raised edge can be approximately 200 μm. This ensures that a defined bearing line remains even in unfavorable conditions, which is not subject to such elastic or plastic deformation that the defined bearing line becomes an undefined bearing area.

The raised edge can be rounded, which has the advantage of continued linear contact even with angular motions.

Alternatively, the second bearing area of the at least one plate may have at least one raised edge, which is in contact with the intermediate member. This ensures that a defined bearing line remains even in unfavorable conditions, which is not subject to such elastic or plastic deformation that the defined bearing line becomes an undefined bearing area.

Ground surfaces of the intermediate member and/or the support element may be provided, which has the advantage of minimizing friction between the bearing areas.

The actuator can be a piezoelectric actuator, which has the advantage of very rapid longitudinal motion when relatively large forces have to be transmitted and very compact spatial dimensions.

A translation ratio in the range of approximately 1:4 to 1:20 can be provided for an excursion of the actuator to an excursion of the control member. This has the advantage that relatively large control motions can be executed with an extremely compact actuator.

Also, a translation ratio of approximately 1:6 between the excursions of the actuator and the control member can be provided, with the advantage that even when relatively large control motions have to be transmitted, sufficiently large forces can still be transmitted.

A device advantageously may comprise one or more of the above-mentioned features, for transmitting an excursion of an actuator, in particular a piezoactuator of an injection valve, in which at least a first lever device and a second lever device are provided, with the excursion of the actuator being transmitted from the first lever device to the second lever device. Two lever devices are thus "connected in series", as a result of which high lever ratios and therefore large control motions are achieved with an extremely compact structure. In certain cases intermediate parts or elements can be provided between the actuator and the first lever device and/or between the first lever device and the second lever device, if this is advantageous.

The excursion of the actuator can be transmitted from the second lever device to a control member. One or more intermediate parts or elements can thereby also be provided between the second lever device and the control member, if this is advantageous.

Even with embodiments with at least two lever devices, the first lever device and/or the second lever device can comprise at least one transmission element disposed substantially perpendicular to the direction of excursion of the actuator. This allows it to be ensured in a simple manner that the force transmitted to the control member is parallel to the direction of excursion of the actuator, as is often required.

In this context, according to preferred embodiments of the device, at least one transmission element can be essentially plate-shaped. A plate-shaped transmission element structure can effectively contribute to a compact structure of the device according to the invention.

According to one preferred embodiment of the device, at least one surface of at least one transmission element may be convex. An at least slightly convex form of the transmission elements can advantageously provide the necessary space for the relative motion of the transmission elements in respect of each other and/or of the transmission elements and the housing. Also an at least slightly convex form impacts advantageously on friction conditions, in particular when the relative motion is achieved as a result of sliding.

The device may comprise a first transmission element with a first, second and third bearing area and a second transmission element with a fourth, fifth and sixth bearing area, with the first bearing area being assigned to a first counter bearing, the second bearing area being assigned to the actuator, the third bearing area being assigned to the second transmission element, the fourth bearing area being assigned to a second counter bearing, the fifth bearing area being assigned to the first transmission element and the sixth bearing area being assigned to a control member. In some circumstances further elements can also be provided between the respective bearing areas and the components assigned to them, if this is advantageous.

In this context, provision is preferably also made for the first transmission element to be supported with the first bearing area against the first counter bearing when the actuator acts on the second bearing area and to act by means of a rotational motion with the third bearing area on the fifth bearing area of the second transmission element, said element being supported with the fourth bearing area on the second counter bearing and acting by means of a rotational motion with the sixth bearing area on the control member. Depending on the embodiment, translatory motions can in some circumstances be superimposed on the rotational motions of the transmission elements.

According to a particularly preferred embodiment of the device, one actuator central axis and one control member central axis may pass through the second bearing area and the sixth bearing area. This solution allows a particularly compact structure of the device according to the invention.

According to all the embodiments of the device, at least one counter bearing and/or at least one transmission element in the area of the first or fourth bearing area can have at least one rounded section, which allows rolling in respect of a relative motion between a housing and the transmission element. If a transmission element also executes a translatory motion in respect of the housing, this can in some circumstances be superimposed on the rolling motion. Rolling generally causes less loss than for example pure sliding and is therefore advantageous. Rolling also has a positive impact on wear.

In this context provision can also be made for at least one rounded section to be formed by at least one separate element. In this case it is preferable for surfaces of the housing and/or the transmission element(s) coming into contact with the separate element(s) to be adapted at least partially to the form of the separate elements.

According to another advantageous embodiment, at least one separate element can be supported in a rotatable manner in the housing.

Additionally or alternatively provision can be made for at least one separate element to be supported in a movable manner in the housing. In this case the at least one separate element can for example comprise a planar lower side, with which it can be moved on a housing section, and an upper side with a semi-circular cross-section, which forms the rounded section and allows the rolling of the transmission element.

With a particularly preferred embodiment, provision is made in this context for at least one separate element to be formed by a sphere or a drum. In this way for example embodiments can be produced, in which the transmission elements execute pure rotational or swinging motions in respect of the housing. In this case there is generally a greater relative motion between the respective transmission element and the component acting on it, whereby this relative motion can be achieved by sliding.

A method for producing a transmission element for a device according to the embodiments disclosed above comprises that the transmission element is forged and/or milled and then at least its bearing areas are ground. This method according to the invention has the advantage that it can be used to produce a transmission element according to the invention very economically. Also the transmission element is able to transmit large control forces over a long operating period. The method for producing an actuator according to the invention also has the advantage of a high level of precision for the production of identical transmission elements, which maintain their positive characteristics with a high level of constancy due to the low level of wear, even during long-term operation.

The device disclosed above is particularly suitable for an injection device. It is quite particularly suitable for an injection device which operates according to what is known as the pump-nozzle principle.

BRIEF DESCRIPTION OF THE DRAWINGS

The invention is now described in more detail using embodiments with reference to the attached figures. These show.

DETAILED DESCRIPTION OF THE PREFERRED EMBODIMENTS

One embodiment of the device according to the invention is disclosed below based on FIGS. 1a to 6b; identical parts are essentially assigned the same references and said parts are therefore not described more than once.

Figure 1A:
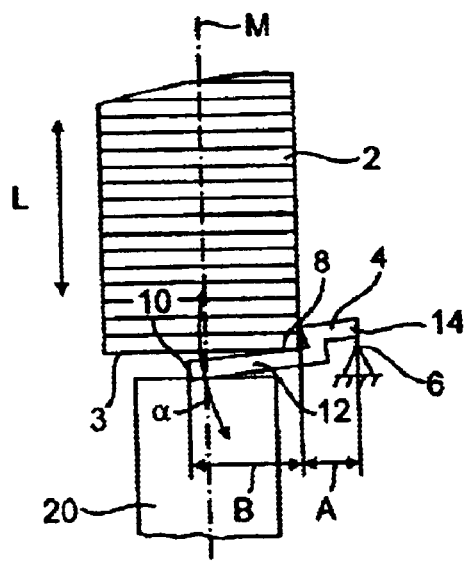
FIG. 1a a diagrammatic representation of the principles of operational interaction of actuator, transmission element and control member, FIG. 1b a diagrammatic representation of the principles of a variant of the embodiment according to FIG. 1a, FIG. 2 a diagrammatic longitudinal section of a transmission element between actuator and control member, FIG. 3a a detailed section of the diagrammatic representation of the principles according to FIG. 1a, FIG. 3b a detailed section of a variant of the embodiment according to FIG. 3a FIG. 4 a perspective representation of an offset plate of the transmission element, FIG. 5 a perspective representation of a support element between plate and control member, FIG. 6a a perspective representation of an intermediate member between actuator and transmission element, FIG. 6b a top view of the intermediate member according to FIG. 6a, FIG. 7 a diagrammatic representation of the principles of an embodiment of the device according to the invention, in which two lever devices connected in series are provided, FIG. 8 a diagrammatic representation of the principles of an embodiment of the device according to the invention, in which relative motion between the transmission elements and the housing is achieved by rolling and FIG. 9 a diagrammatic representation of the principles of an embodiment of the device according to the invention, in which relative motion between two transmission elements and the housing is achieved by a combination of rolling and translation.

FIG. 1a shows a diagrammatic representation of the principles of operational interaction of an actuator 2, a transmission element 4 and a control member 20. The actuator 2 can for example be a piezoelectric actuator, comprising a number of piezo disks stacked one on top of the other, as shown in the drawing. The actuator 2 can be expanded in a linear manner along a longitudinal direction L by applying an electric voltage, whereby the longitudinal direction L is parallel to the central axis M of the actuator 2. The actuator 2 acts with its lower face 3 or an intermediate member not shown here on a transmission element 4, which is supported in a fixed manner peripherally on a first bearing area 6. The first bearing area 6 can for example be a fixed housing edge, etc. The point of contact between the actuator 2 and the transmission element 4 is hereafter referred to as the second bearing area 8. A third bearing area 10 is a point of contact between the transmission element 4 and the control member 20 and can for example be a valve piston, etc. All three bearing areas 6, 8, 10 can be configured as linear contact or as point bearings.

As can be seen from FIG. 1a, the central axes M of the actuator 2 and m of the control member 20 are preferably coincident, which allows space-saving incorporation of the entire device. The device according to the invention can for example be used as a valve control member in an injection, valve, where there is generally only limited space for incorporation in the cylinder head of an internal combustion engine. For this reason a concentric arrangement of the actuator 2 and control member 20 is in some circumstances advantageous as is the shortest possible actuator 2. In order however to be able to achieve adequate travel of the control member 20 in an ideally short actuator 2, the transmission element 4 is used to achieve a translation of short excursions of the actuator 2—depending on the translation required—to longer excursions of the control member 20.

As can be seen in the diagrammatic representation, a second straight section 14 of the transmission element 4 configured as an offset plate 5 (see FIG. 4) assigned to the first bearing area 6 is provided, which opens via a step into a first straight section 12 of the plate 5. The second bearing area 8 is assigned to upper side of this first straight section 12 and the third bearing area 10 to the lower side. The distance of the first lever arm A between the first bearing area 6 of the housing and the second bearing area 8 of the actuator 2 is substantially smaller than the distance of the second lever arm B between the second bearing area 8 and the third bearing area 10 of the control member 20. This gives a lever ratio of 1:4 to 1:20, but preferably approx. 1:6 to 1:7.

A piezoelectric actuator with typical dimensions of 7×7 (cross-sectional length×cross-sectional width, both in millimeters)×30 (length of actuator 2 in direction of central axis M in millimeters) is able to achieve maximum excursions of approx. 45 μm. This corresponds to an excursion of the control member of approx. 270 to 315 μm, depending on the translation required. With a typical overall plate 5 length of approx. 10 mm, this results in a first lever arm A with a length of approx. 1.4 mm and a second lever arm B with a length of approx. 8.6 mm.

In a preferred embodiment of the invention not only is a transmission element 4 provided between the actuator 2 and the control member 20 but at least two transmission elements 4 disposed in a parallel or concentric manner in relation to each other. In this way the control forces of the actuator 2, which is expanding in a linear manner, are transmitted in a substantially more even manner to the control member 20, as at least two bearing areas 6, 8, 10 are provided in each instance on each of the components 2, 4, 20. This configuration at the same time serves to reduce the compressive load at the bearing areas 6, 8, 10 and results thereby in less wear due to abrasion, which increases the life of the device according to the invention.

The transmission elements 4, which are preferably configured in a triangular manner in longitudinal cross-section, with the third bearing area 10 in the acute-angled point of the triangle, can thereby be slightly interlaced if required and therefore parallel to each other, with the third bearings areas 10 of each transmission element 4 projecting in each instance over the central axis M, from their peripheral areas of the second straight section 14. Where there are more than two transmission elements 4, these are preferably disposed in a concentric or radial manner, with their third bearing areas 10 not projecting over the central axis M.

Figure 2:
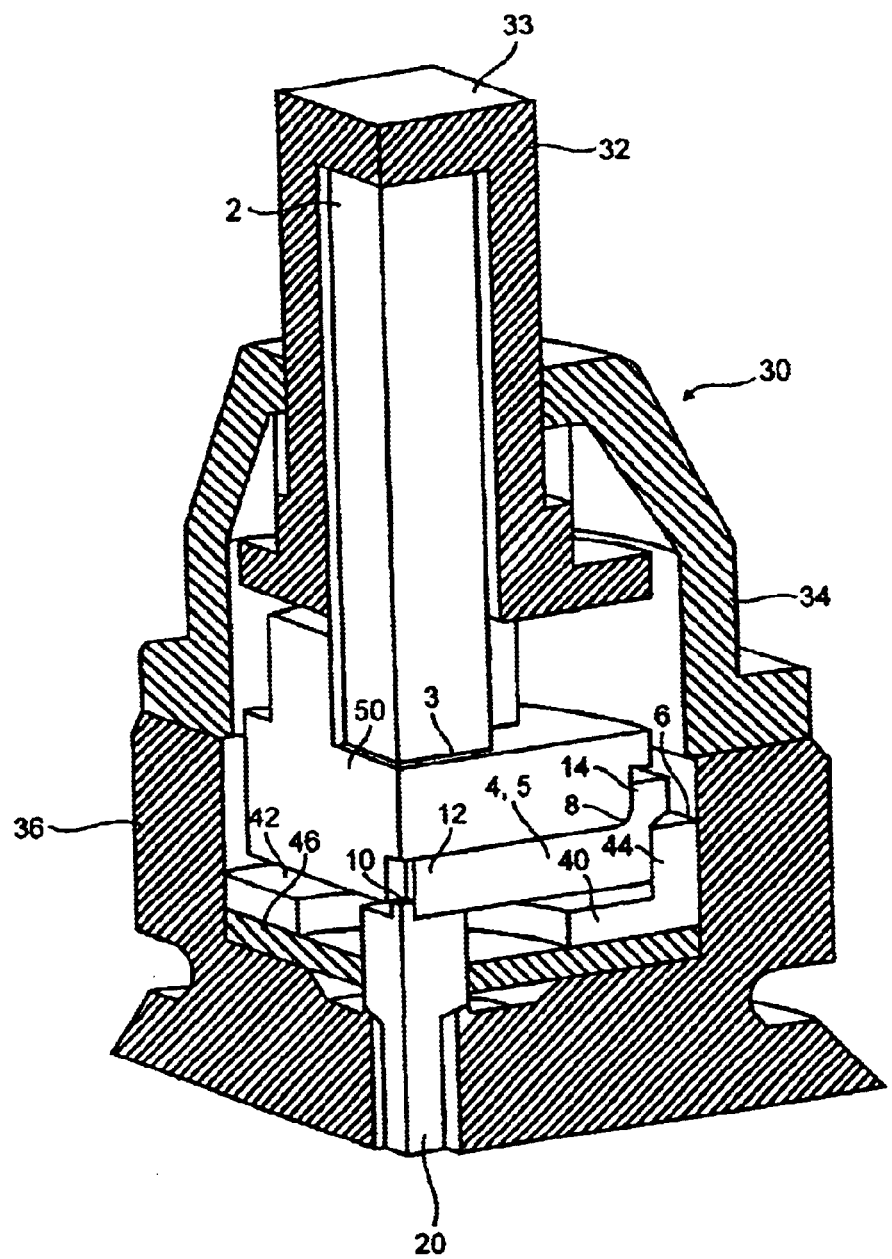

FIG. 2 shows a diagrammatic longitudinal section of a transmission element 4 configured as an offset plate 5 between the actuator 2 and the control member 20, which are enclosed by a housing 30 comprising a number of parts. The oblong actuator 2 here is enclosed by a similarly oblong actuator housing 32, which is closed off by an upper face. The actuator housing is connected non-positively or by a material fit to an upper housing part 34, which in turn is connected positively, non-positively or by a material fit to a pedestal-type lower housing 36. The housing parts 32, 34, 36 are preferably made of steel, as a certain rigidity is required due to the actuator motion.

Figure 1B:
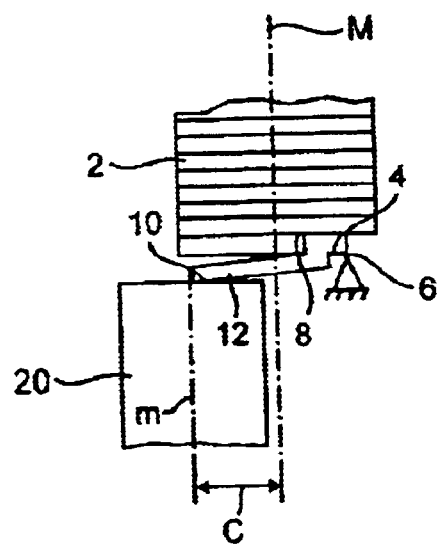

FIG. 1b shows a variant of the arrangement according to FIG. 1a, in which the central axis M of the actuator 2 and the central axis m of the control member 20 are not coincident but are offset by a third lever arm C. This variant is preferably suitable for the use of only one transmission element 4 between the actuator 2 and the control member 20. The actuator 2 can hereby be configured in a stepped manner to form a second bearing area 8, as shown in FIG. 1b. The remainder of the structure corresponds to that of FIG. 1a.

As can be seen from FIG. 2, the offset plate 5 rests with its first bearing area 6 of the second straight section 14 on an edge of a support element 40 (see FIG. 5), which comprises a base side 42 with the contour of a quadrant segment and a peripheral section 44 perpendicular to this. The base side 42 rests with its flat lower side on a circular disk element 46, which comprises a central recess to allow the control member 20 to pass through and for its part lies with its flat lower side on the lower housing part 36.

The lower face 3 of the actuator 2 is adjacent to an intermediate member 50 (see FIGS. 6a and 6b), which comprises the second bearing area 8 in respect of the plate 5 on its substantially flat lower side. The intermediate member 50 lies with its upper side connected positively to the lower face 3 of the actuator 2 and in turn forms the second bearing area 8 in respect of the transmission element 4 or the second bearing area 8 in respect of the two or more transmission elements 4 on its lower side.

Figure 3A:
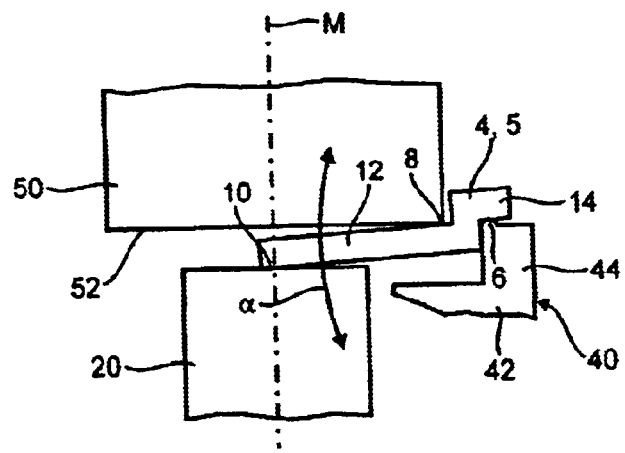

As can be seen in FIG. 3a, which shows a detailed section of the diagrammatic representation of the principles according to FIG. 1, the second bearing area 8 and the first bearing area 6 are each configured as a raised edge, each of which preferably has a height of approx. 200 μm above the lower side 52 of the intermediate member (bearing area 8) or the upper side of the peripheral section 44 (bearing area 6). These raised edges are preferably rounded in a hemispherical manner and each bring about linear contact with the offset plate 5 at a defined bearing edge in each instance. With the significant control forces occurring during operation due to the actuator travel, this prevents flattening of the flat lower side 52 of the intermediate member 50 or the flat upper side of the peripheral section 44 of the support element, which would otherwise be subject to plastic deformation or material degradation, which would result in a slow migration of the bearing areas 6, 8 and therefore displacement of the effective lever articulations.

The defined rotation through an angle α about the approximately constant point of rotation of the first bearing area 6 can be seen in both FIG. 1 and FIG. 3. The bearing area 8 here is subject to minimal displacement due to the very short first lever arm A and the relatively small angle a. Assignment of the two bearing areas 6 and 8 on one plane means there is minimal rotational motion in the contact points. The third bearing area 10 between the first straight section 12 of the offset lever 5 and the upper side of the control member 20 is subject to relatively the largest displacement.

Figure 3B:
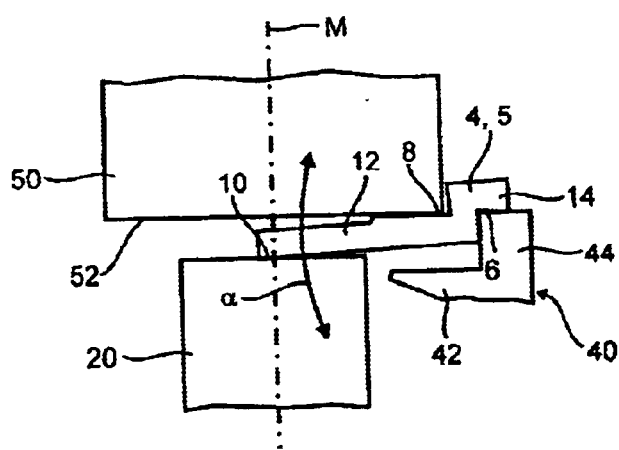

As can be seen in FIG. 3b, which shows a variant of the embodiment according to FIG. 3a, the second bearing area 8 and the first bearing area 6 are each configured as raised edges on the transmission element 4. The raised edges each project by a height of approx. 200 μm above the first straight section 12 (bearing area 8) or the second straight section 14 (bearing area 6) of the offset transmission element 4. The raised edges each bring about linear contact with the lower side 52 of the actuator 2 or with the control member 20. With the significant control forces occurring during operation due to the actuator travel, this prevents flattening of the flat lower side 52 of the intermediate member 50 or the flat upper side of the peripheral section 44 of the support element, which would otherwise be subject to plastic deformation or material degradation, which would result in a slow migration of the bearing areas 6, 8 and therefore displacement of the effective lever articulations.

The defined rotation through an angle α about the approximately constant point of rotation of the first bearing area 6 can be seen in both FIG. 1 and FIG. 3. Because of the very short first lever arm A and the relatively small angle α, the bearing area 8 is subject to minimal displacement. Assignment of the two bearing areas 6 and 8 on one plane means there is minimal rotational motion in the contact points. The third bearing area 10 between the first straight section 12 of the offset lever 5 and the upper side of the control member 20 is subject to relatively the largest displacement.

Figure 4:
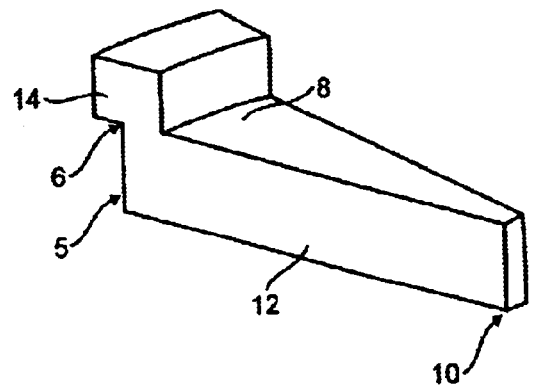

FIG. 4 shows a perspective representation of the offset plate 5 of the transmission element 4, which shows a triangular contour in longitudinal cross-section. The first straight section 12 with the second lever arm B passes via a step formed between the second bearing area 8 and the first bearing area 6 into the second straight section 14. The plate 5 is preferably forged from a steel material and then ground, to ensure optimum wear resistance even during long-term operation. The plate 5 can if necessary also be milled, although a forged part has the advantage of more favorable fiber orientation for operating strength in the material. The surfaces, which later form the first, second and third bearing areas 6, 8, 10, are preferably ground, resulting on the one hand in an ideally smooth surface structure and on the other hand, depending on the contact pressure of the grinding wheels, so that the required compression and therefore surface area toughness can be achieved in the material.

Figure 5:
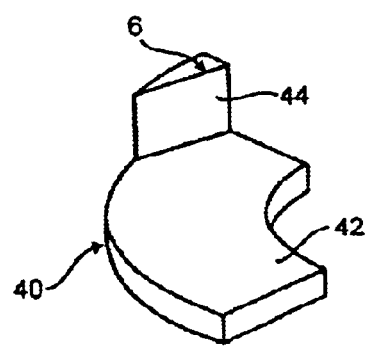

FIG. 5 shows a perspective representation of the support element 40 between the plate 5 and the control member 20, which is preferably also milled or cold or hot formed from a steel material and has ground surfaces. On the base plate 42, which forms a quadrant segment, a peripheral section 44 is provided peripherally at a right angle, on the surface of which the approx. 200 μm raised edge is provided to form the first bearing area 6.

Figure 6A:
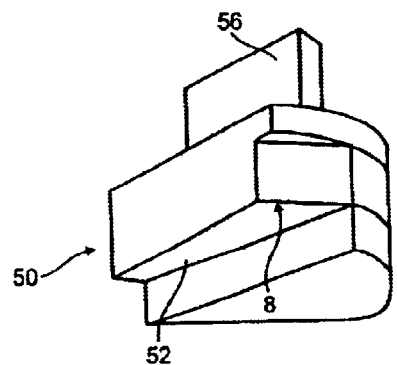
Figure 6B:
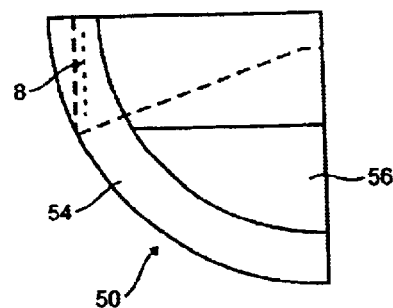

FIG. 6a shows a perspective representation of the intermediate member 50 between the actuator 2 and the transmission element 4, which is preferably also milled or forged from a steel material and has ground surfaces. Viewed from above (see FIG. 6b), the intermediate member 50 has the contour of a quadrant and is provided on its upper side 54 with a spigot 56, which has the contour of a quarter ellipse (see FIG. 6b) with a flat surface. On its lower side is the intermediate member with the raised edge forming the second bearing area 8, said edge being preferably rounded and having a height of approx. 200 μm. The raised spigot 65 is at the side of the actuator 2, the lower side 3 of which rests in a planar manner on the upper side 54 of the intermediate member 50.

Figure 7:
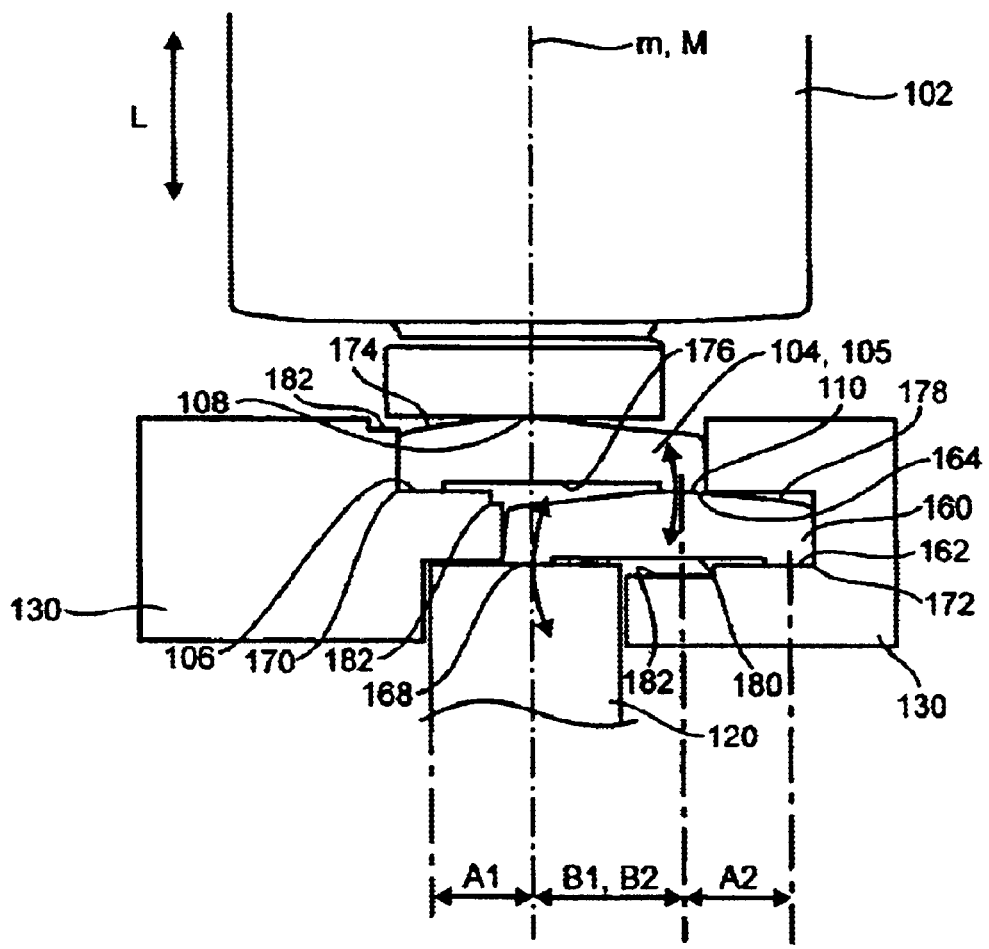

FIG. 7 shows a diagrammatic representation of the principles of an embodiment of the device according to the invention, in which two lever devices are connected in series. The device shown comprises a first, substantially plate-shaped, transmission element 104, which is disposed perpendicular to the direction of excursion L of an actuator 102. The first transmission element 104 or the plate 105 has first bearing area 106, which is assigned to a first counter bearing 107 formed in a housing 130. The first transmission element 104 also comprises a second bearing area 108, which is assigned to the actuator 102. A third bearing area 110 of the first transmission element 104 is assigned to a second transmission element 160, which will be described below. The first transmission element 104 comprises a (slightly) convex surface 174, the form of which can be defined for example by grinding. The second bearing area 108 is hereby formed by the highest area The lower side of the first transmission element 104 comprises a recess 176, which allows relative motion between the first transmission element 104 and the housing 130. This relative motion is produced, when the actuator 102 acts in the second bearing area 108 of the first transmission element 104. A second transmission element 160, which can be configured with a structure identical to that of the first transmission element 104, comprises a fourth bearing area 162, which is assigned to a second counter bearing 172, which is provided in the housing 130. The second transmission element also comprises a fifth bearing area 164, which is provided in the highest area of the convex surface 178. A sixth bearing area 168 is assigned to a control member 120 to be activated. In order to ensure the clearance required for relative motion between the second transmission element 160 and the housing 130, a recess 180 is provided on the lower side of the second transmission element 160. Recesses or graduations 182 are also provided in the housing 130 to allow the respective relative motions. The first transmission element 104 comprises a first (short) lever arm A1 and a second (long) lever arm B1. Similarly the second transmission element 160 comprises a first (short) lever arm A2 and a second (long) lever arm B2. A downward excursion of the actuator 102 is transmitted by the structure shown to the control member 120, by the third bearing area 110 of the first transmission element 104 first being deflected according to the ratio of A1 and B1. The third bearing area 110 of the first transmission element 104 thereby acts on the fifth bearing area 164 of the second transmission element 160 and deflects the second transmission element 160. The sixth bearing area 168 of the second transmission element 160 thereby acts on the control member 120 and deflects this according to the size of the excursion of the actuator 102 and the lengths of the lever arms A1, B1, A2 and B2. The two-step lever device shown allows a large lever action without taking up much space. Of course more than two lever steps can be provided, if required. With the embodiment shown the central axis m of the actuator and the central axis M of the control member coincide, which is a requirement in many cases. The central axes m and M thereby pass through the second bearing area 108 and the sixth bearing area 168. A preferred translation ratio of the excursion of the actuator 102 to the excursion of the control member 120 is approximately 1:5. An example of the dimensions of the respective lever arms is A1=A2=2.4 mm and B1=B2=3.6 mm.

Figure 8:
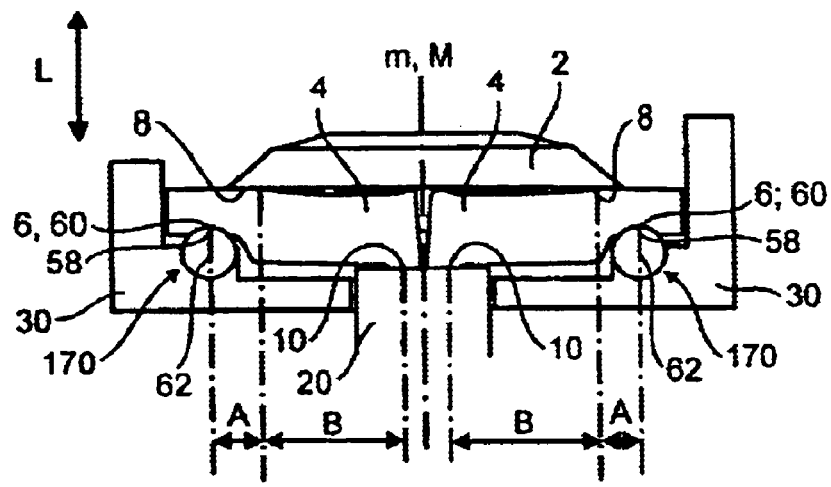

FIG. 8 shows a diagrammatic representation of the principles of an embodiment of the device according to the invention, in which the relative motion between the transmission elements and the housing is achieved by rolling. With this embodiment of the device according to the invention, an actuator 2, which is only partially shown, acts on two transmission elements 4, which are disposed opposite each other. The transmission elements 4 comprise first and second lever arms A and B, the lengths of which determine the translation ratio of the excursion of the actuator 2 to the excursion of the control member 20. Both transmission elements 4 comprise a first bearing area 6, which is assigned to a respective counter bearing 170. Both transmission elements 4 also comprise a second bearing area 8, which is assigned to the actuator 2. Third bearing areas 10 of the two transmission elements 4 are assigned to the control member 20. In the embodiment shown in FIG. 8, the counter bearings 170 comprise two drums 62, which are supported in a rotatable but fixed manner in the housing 30. The drums 62 form rounded sections 58, which interact with rounded sections 60 forming recesses in the transmission elements 4 so that the relative motion between the housing 30 and the transmission elements 4 is a rolling motion. The geometry of the recesses in the transmission elements 4 here is preferably adapted to the geometry of the drums 62. The relative motion between the actuator 2 and the transmission elements 4 is achieved by sliding in the area of the second bearing area 8. The embodiment shown in FIG. 8 thereby minimizes losses, which occur due to relative motion between the transmission elements 4 and the housing 30.

Figure 9:
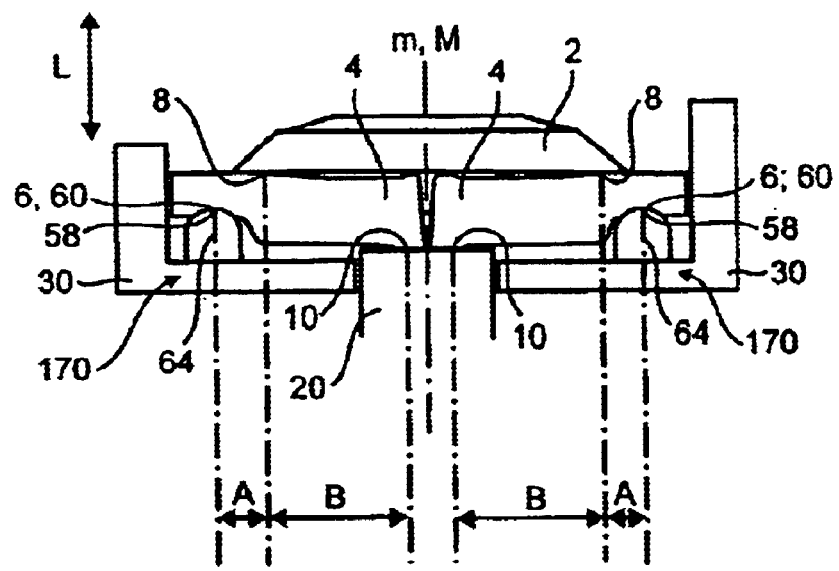

FIG. 9 shows a diagrammatic representation of the principles of an embodiment of the device according to the invention, in which the relative motion between two transmission elements and the housing is achieved by a combination of rolling and translation. The structure of the embodiment of the device according to the invention shown in FIG. 9 corresponds, apart from the differences described below, to the structure according to FIG. 8. In the embodiment shown in FIG. 9 however, the counter bearings 170 comprise separate elements 64, which are supported in a movable manner in the housing 30. The separate elements 64 have a rounded section 58 on their upper side, with a hemispherical cross-section in the case shown. These rounded sections 58 interact with rounded sections 60, which are formed by (small) recesses in the transmission elements 4. In this case too the geometry of the rounded sections 58 and the rounded sections 60 should preferably be coordinated. The rounded sections 58, 60 allow the transmission elements to roll, while the sliding of the separate elements 64 in the housing 30 allows a translatory motion. Relative motion between the actuator 2 and the transmission elements 4 is also achieved in this embodiment by sliding, whereby the relative motion between the actuator 2 and the transmission elements 4 can be dispensed with in the embodiment shown in FIG. 9, as in the embodiment according to FIG. 8.

Both in the embodiment according to FIG. 8 and the embodiment according to FIG. 9 the surfaces of the separate elements 62, 64 of the sections of the housing 30 coming into contact with these and the transmission elements 4 are preferably such that low friction values are achieved. The same applies to the surfaces in contact in the area of the second bearing area 8.

Although not shown, similar results can also be achieved, if the rounded areas are not formed by separate elements 62, 64 but form a single part with the transmission elements 4 or the housing 30, for example in the form of suitable projections.

The transmission element according to the invention can advantageously be used to active a servo-valve in a fuel injector, as the relatively small linear excursions of a piezo-actuator here can effectively be converted to longer travel to regulate a valve. The transmission element according to the invention is therefore suitable both for what is known as a common rail injector in a high-pressure storage type injection system and for what is known as a pump-nozzle injector, in which the injection pressure is generated with every power stroke by means of a high-pressure pump assigned to each injector.

It is evident to the person skilled in the art that the invention is not restricted in design to the preferred embodiments outlined above. Instead further variants are also conceivable, which make use of the solution presented even with fundamentally different types of design and are therefore covered by the invention.

We claim:

1. A device for transmitting an excursion of an actuator, comprising:
    at least one transmission element,
    a first, a second, and a third bearing area,
    wherein the first bearing area is assigned to a counter bearing, the second bearing area is assigned to the actuator and the third bearing area is assigned to a control member,
    wherein the at least one transmission element is supported with the first bearing area against the counter bearing when the actuator is operated and moves the control member with the third bearing area by means of a rotational motion about a point of rotation,
    wherein the at least one transmission element is configured substantially in the form of a plate, which is disposed substantially perpendicular to the control motion, and
    wherein the first, second and third bearing areas are each configured as substantially flat surfaces on the plate.

2. The device according to claim 1, further comprising a distance between a central axis of the actuator and a central axis of the control member.

3. The device according to claim 1, further comprising at least two transmission elements, which are disposed opposite each other.

4. The device according to claim 1, further comprising at least three transmission elements, which are disposed in a substantially concentric manner in respect of each other.

5. The device according to claim 3, further comprising concentric central axes of the actuator and the control member.

6. The device according to claim 1, wherein the plate of the at least one transmission element is configured in a stepped manner.

7. The device according to claim 6, wherein the second bearing area is assigned to an upper side and the third bearing area is assigned to a lower side of a first straight section of the stepped plate.

8. The device according to claim 6, wherein the first bearing area is assigned to a lower side of a second straight section of the stepped plate.

9. The device according to claim 6, wherein a first and a second straight sections of the stepped plate are connected by means of a connecting section.

10. The device according to claim 6, wherein a second straight section of the stepped plate encompasses a lower sleeve area of the actuator.

11. The device according to claim 6, wherein an upper side of a first straight section and a lower side of a second straight section lie approximately on a common plane.

12. The device according to claim 1, wherein the plate is produced by cold or hot forming.

13. The device according to claim 1, further comprising ground surfaces of the bearing areas of the plate.

14. The device according to claim 1, wherein an intermediate member connected to the actuator is provided between the actuator and the second bearing area of the at least one transmission element.

15. The device according to claim 14, further comprising a positive, non-positive or material-fit connection between the actuator and the intermediate member.

16. The device according to claim 14, wherein the intermediate member comprises at least one raised edge, which is in contact with the second bearing area of the at least one transmission element.

17. The device according to claim 16, further comprising linear contact between the raised edge of the intermediate member and the second bearing area of the transmission element.

18. The device according to claim 16, further comprising a raised edge height of approximately 200 $\mu$m.

19. The device according to claim 16, further comprising a rounded raised edge.

20. The device according to claim 14, wherein the second bearing area of the at least one transmission element comprises at least one raised edge, which is in contact with the intermediate member.

21. The device according to claim 20, further comprising linear contact between the raised edge of the second bearing area of the transmission element and the intermediate member.

22. The device according to claim 20, further comprising a raised edge height of approximately 200 µm.

23. The device according to claim 20, further comprising a rounded raised edge.

24. The device according to claim 1, wherein at least one support element is provided as the counter bearing between a housing and the first bearing area of the at least one transmission element.

25. The device according to claim 24, wherein the support element comprises a raised edge, which is in contact with the first bearing area of the at least one transmission element.

26. The device according to claim 25, further comprising a linear contact between the raised edge of the support element and the first bearing area of the transmission element.

27. The device according to claim 25, further comprising a raised edge height of approximately 200 µm.

28. The device according to claim 25, further comprising a rounded raised edge.

29. The device according to claim 24, further comprising ground surfaces of the intermediate member or the support element.

30. The device according to claim 1, wherein the actuator is a piezoelectric actuator.

31. The device according to claim 1, further comprising a translation ratio in the range of approximately 1:4 to 1:20 of an excursion of the actuator to an excursion of the control member.

32. The device according to claim 1, further comprising a translation ratio of approximately 1:6 of an excursion of the actuator to an excursion of the control member.

33. The device according to claim 1, further comprising a triangular contour of the longitudinal section of the plate.

34. The device according to claim 1, for transmitting an excursion of an actuator, in particular a piezoactuator of an injection valve, wherein at least a first lever device and a second lever device are provided, and whereby the excursion of the actuator is transmitted from the first lever device to the second lever device.

35. The device according to claim 34, wherein the excursion of the actuator is transmitted from the second lever device to a control member.

36. The device according to claim 34, wherein the first lever device or the second lever device comprises at least one transmission element disposed substantially perpendicular to the direction of excursion of the actuator.

37. The device according to claim 36, wherein at least one transmission element is substantially plate-shaped.

38. The device according to claim 36, wherein at least one surface of at least one transmission element is convex.

39. The device according to claim 36, wherein it comprises a first transmission element with a first, second and third bearing area and a second transmission element with a fourth, fifth and sixth bearing area, whereby the first bearing area is assigned to a first counter bearing, the second bearing area is assigned to the actuator, the third bearing area is assigned to the second transmission element, the fourth bearing area is assigned to a second counter bearing, the fifth bearing area is assigned to the first transmission element and the sixth bearing area is assigned to a control element.

40. The device according to claim 39, wherein an actuator central axis and a control element central axis pass through the second bearing area and the sixth bearing area.

41. The device according to claim 39, wherein the first transmission element is supported with the first bearing area against the first counter bearing when the actuator acts on the second bearing area and acts with the third bearing area on the fifth bearing area of the second transmission element by means of a rotational motion, said transmission element being supported with the fourth bearing area against the second counter bearing and acting with the sixth bearing area on the control member by means of a rotational motion.

42. The device according to claim 1, wherein at least one counter bearing or at least one transmission element comprises at least one rounded section in the area of the first or fourth bearing area, said rounded section allowing rolling in respect of a relative motion between a housing and the transmission element.

43. The device according to claim 42, wherein at least one rounded section is formed by at least one separate element.

44. The device according to claim 42, wherein at least one separate element is supported in a rotatable manner in the housing.

45. The device according to claim 42, wherein at least one separate element is supported in a movable manner in the housing.

46. The device according to claim 42, wherein at least one separate element is formed by a sphere or a drum.

47. A method for producing a transmission element for a device comprising the steps of:

providing a first, a second, and a third bearing area, assigning the first bearing area to a counter bearing, assigning the second bearing area to an actuator, assigning the third bearing area to a control member, supporting the transmission element with the first bearing area against the counter bearing when the actuator is operated and moves the control member with the third bearing area by means of a rotational motion about a point of rotation, configuring the transmission element substantially in the form of a plate, which is disposed substantially perpendicular to the control motion, configuring the first, second and third bearing areas as essentially flat surfaces on the plate, and forging or milling the transmission element and then grounding the transmission element on at least one bearing area.

48. The method according to claim 47, wherein the intermediate member is ground at least on its surfaces in contact with the second bearing area of the transmission element.

49. The method according to claim 47, wherein the support element is ground on at least its surfaces in contact with the first bearing area of the transmission element.

50. Injection device with a device for transmitting an excursion of an actuator, with at least one transmission element, comprising a first, a second, and a third bearing area, wherein the first bearing area is assigned to a counter bearing, the second bearing area is assigned to the actuator and the third bearing area is assigned to a control member, wherein the at least one transmission element is supported with the first bearing area against the counter bearing when the actuator is operated and moves the control member with the third bearing area by means of a rotational motion about a point of rotation, wherein the at least one transmission element is configured substantially in the form of a plate, which is disposed substantially perpendicular to the control motion, and wherein the first, second and third bearing areas are each configured as essentially flat surfaces on the plate.

51. Injection device according to claim 50, wherein the device operates by a pump-nozzle principle.

* * * * *